(12) United States Patent
Li et al.

(10) Patent No.: US 11,099,879 B2
(45) Date of Patent: Aug. 24, 2021

(54) EXECUTING AN APPLICATION WITH MULTIPLE PROCESSORS

(71) Applicant: INTEL CORPORATION, Santa Clara, CA (US)

(72) Inventors: Tianyou Li, Shanghai (CN); Shu Xu, Shanghai (CN); Jinkui Ren, Shanghai (CN); Zidong Jiang, Shanghai (CN); Weiliang Lin, Shanghai (CN); Chaobo Zhu, Shanghai (CN); Yong Hu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 16/469,278

(22) PCT Filed: Dec. 16, 2016

(86) PCT No.: PCT/CN2016/110253
§ 371 (c)(1),
(2) Date: Jun. 13, 2019

(87) PCT Pub. No.: WO2018/107448
PCT Pub. Date: Jun. 21, 2018

(65) Prior Publication Data
US 2019/0324790 A1    Oct. 24, 2019

(51) Int. Cl.
*G06F 9/455* (2018.01)
*G06F 9/38* (2018.01)

(52) U.S. Cl.
CPC ........ *G06F 9/45558* (2013.01); *G06F 9/3838* (2013.01); *G06F 2009/45562* (2013.01)

(58) Field of Classification Search
CPC ............... G06F 9/45558; G06F 9/3838; G06F 2009/45562
See application file for complete search history.

(56) References Cited

U.S. PATENT DOCUMENTS

2008/0104591 A1* 5/2008 McCrory ............ G06F 9/45558
718/1
2016/0048409 A1    2/2016 Briel et al.
(Continued)

FOREIGN PATENT DOCUMENTS

| CN | 102841805 A | 12/2012 |
|---|---|---|
| CN | 102843235 A | 12/2012 |

OTHER PUBLICATIONS

International Search Report for related PCT Application PCT/CN2016/110253 with a completion date of Sep. 14, 2017 and dated Sep. 21, 2017, 2 pages.

(Continued)

*Primary Examiner* — Gregory A Kessler
(74) *Attorney, Agent, or Firm* — Hanley, Flight & Zimmerman, LLC (57) ABSTRACT

In one example, a system for executing applications can include a main processor to initialize a virtual machine to execute an application. The main processor can also determine a main utilization indicator of the main processor is above a threshold and an auxiliary utilization indicator of an auxiliary processor is below a threshold, wherein the auxiliary processor is based on an auxiliary instruction set architecture. Additionally, the main processor can transmit an instruction from the application to the auxiliary processor for execution and update context data for the application in response to receiving an execution result from the auxiliary processor.

15 Claims, 6 Drawing Sheets

(56) References Cited

U.S. PATENT DOCUMENTS

| | | | |
|---|---|---|---|
| 2016/0321094 A1 | 11/2016 | Rabi et al. | |
| 2016/0378715 A1* | 12/2016 | Kang | G06F 15/8061 |
| | | | 712/2 |
| 2018/0157515 A1* | 6/2018 | Malloy | H04L 47/627 |

OTHER PUBLICATIONS

International Bureau, "International Preliminary Report on Patentability," mailed in connection with International Patent Application No. PCT/CN2016/110253, dated Jun. 18, 2019, 5 pages.

International Searching Authority, "Written Opinion," mailed in connection with International Patent Application No. PCT/CN2016/110253, dated Sep. 21, 2017, 4 pages.

\* cited by examiner

EXECUTING AN APPLICATION WITH MULTIPLE PROCESSORS

CROSS REFERENCE TO RELATED APPLICATIONS

Pursuant to 35 U.S.C. #371, this application is the United States National Stage Application of International Patent Application No. PCT/CN2016/110253, filed on Dec. 16, 2016, the contents of which are incorporated by reference as if set forth in their entirety herein.

TECHNICAL FIELD

This disclosure relates generally to executing applications and specifically, but not exclusively, to executing instructions from an application with multiple processors based on multiple instruction set architectures.

BACKGROUND

Computing devices are incorporating an increasing number of peripheral devices, sensors, and the like. In some examples, a system on a chip (SOC) can include various processing cores in which each core manages a particular device or sub-system. For example, a core of a system on a chip may be designated for executing instructions for managing a sensor. In some examples, each core can execute different instruction set architectures.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, computing devices can support any suitable number of different instruction set architectures. For example, a system on a chip (SOC) can include various processing cores in which each core manages a particular device or sub-system. In some embodiments, a processor or processing core of a system on a chip can be designated a main processor and additional processors or processing cores can be designated as auxiliary processors. For example, an auxiliary processor or processing core of a system on a chip may be designated for executing instructions for managing a sensor or peripheral device, while a main processor or processing core may be designated for executing instructions for an operating system or any other software or hardware components. In some examples, each core can execute different instruction set architectures.

The techniques described herein include a system that can initialize a virtual machine to execute an application. A virtual machine, as referred to herein, can include any suitable software that executes an emulated operating system. The system can also determine a main utilization indicator of a main processor is above a first threshold and an auxiliary utilization indicator of an auxiliary processor is below a second threshold. In some embodiments, the auxiliary processor is based on an auxiliary instruction set architecture that is different from the main instruction set architecture of the main processor. Furthermore, the system can transmit an instruction for the application to the auxiliary processor for execution and update context data in response to receiving an execution result from the auxiliary processor. For example, the system can update heap information, stack information, and the like, for the application based on updated context data from the auxiliary processor. In some embodiments, executing instructions for the application with the auxiliary processor can enable an application to execute instructions using multiple processors or processing cores based on different instruction set architectures.

In some embodiments, an auxiliary processor can initialize a virtual machine and detect an instruction from a main processor to be executed by the auxiliary processor. For example, the auxiliary processor may initialize a separate virtual machine from the virtual machine executed by the main processor. The virtual machine executed by the auxiliary processor may detect an instruction to be executed by an application operating in the virtual machine of the main processor. The auxiliary processor can also execute the instruction on the auxiliary instruction with the auxiliary instruction set architecture and transmit context data corresponding to the execution of the instruction to the main processor. For example, the auxiliary processor can execute the instruction for the main processor and return execution results to the main processor. In some embodiments, the auxiliary processor can access and store the execution results in memory accessible by the main processor or transmit the execution results to the main processor. By executing instructions with an auxiliary processor, a device can accelerate execution time of an application and reduce power consumption of a device.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
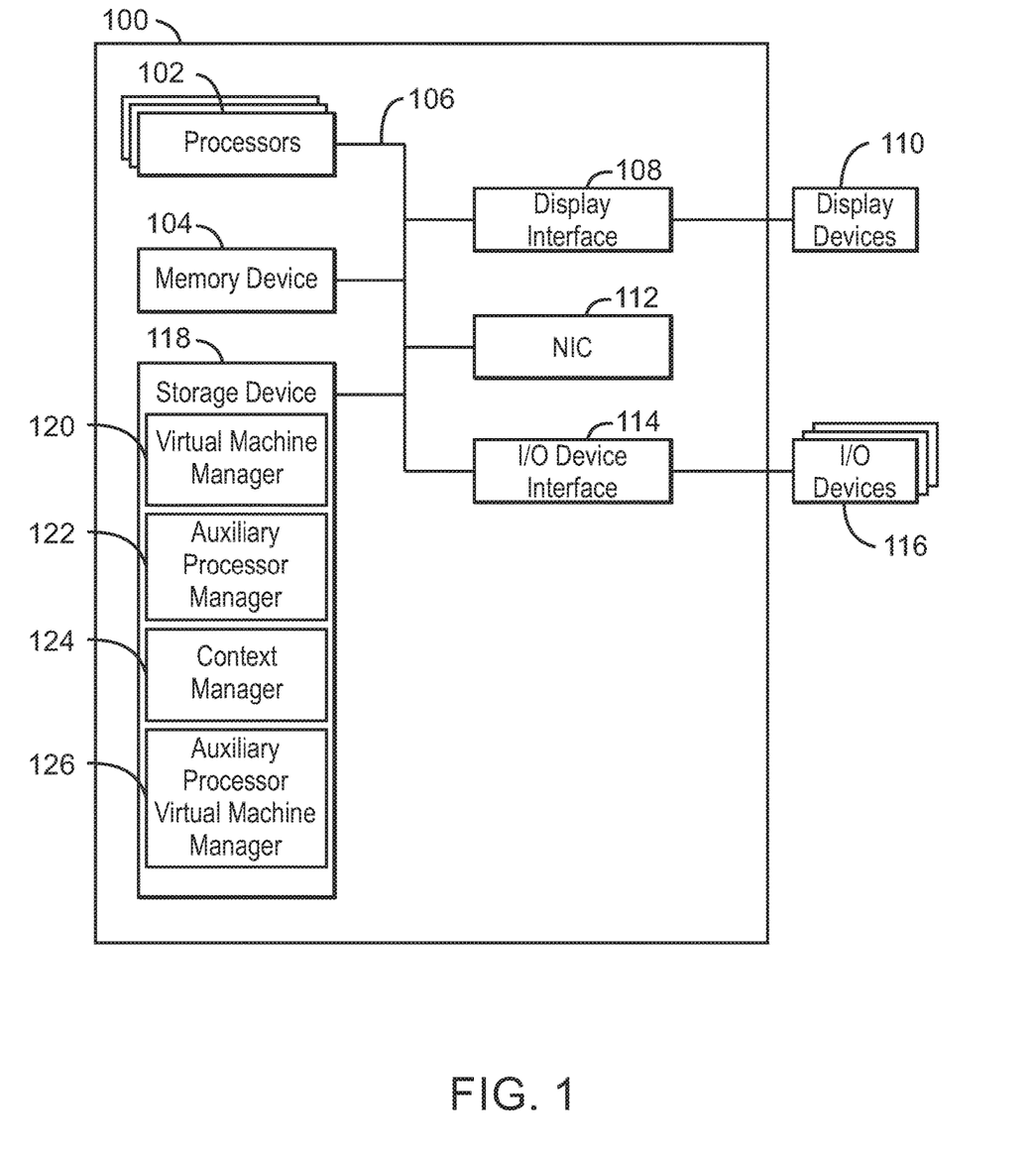
FIG. 1 illustrates a block diagram of a computing device that can execute an application with multiple processors executing different instruction set architectures.

FIG. 1 is a block diagram of an example of a computing device that can execute an application with multiple processors executing different instruction set architectures. The computing device 100 may be, for example, a mobile phone, laptop computer, desktop computer, or tablet computer, among others. The computing device 100 may include any suitable number of processors 102 that are adapted to execute stored instructions, as well as a memory device 104 that stores instructions that are executable by the processors 102. Each processor 102 can be a single core processor, a multi-core processor, a computing cluster, or any number of other configurations. In some embodiments, one of the processors 102 can be designated as a main processor and additional processors 102 can be designated as auxiliary processors. In some embodiments, each of the processors 102 can include a main processing core and auxiliary processing cores. A main processor or a main processing core can execute instructions for the central processing unit. For example, the main processor or the main processing core can execute instructions for an operating system and any other suitable software. An auxiliary processor or an auxiliary processing core can execute instructions for peripheral devices, input devices, and the like. For example, auxiliary processors or auxiliary processing cores can execute instructions for sensors, sensor hubs, keyboards, mice, and the like. The memory device 104 can include random access memory, read only memory, flash memory, or any other suitable memory systems. The instructions that are executed by the processors 102 may be used to implement a method that can execute an application with multiple processors or processor cores executing different instruction set architectures.

The processors 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

In addition, a network interface controller (also referred to herein as a NIC) 112 may be adapted to connect the computing device 100 through the system interconnect 106 to a network (not depicted). The network (not depicted) may be a cellular network, a radio network, a wide area network (WAN), a main area network (LAN), or the Internet, among others.

The processors 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

In some embodiments, the processors 102 may also be linked through the system interconnect 106 to any storage device 118 that can include a hard drive, an optical drive, a USB flash drive, an array of drives, or any combinations thereof. In some embodiments, the storage device 118 can include any suitable applications. For example, the storage device 118 can include a virtual machine manager 120, an auxiliary processor manager 122, and a context manager 124. In some embodiments, a main processor can access and execute the virtual machine manager 120, auxiliary processor manager 122, and context manager 124. In some examples, the virtual machine manager 120 can initialize a virtual machine to execute an application. In some examples, the auxiliary processor manager 122 can determine the main utilization indicator of the main processor is above a first threshold and an auxiliary utilization indicator of an auxiliary processor is below a second threshold. The first threshold can indicate if the main processor is under-utilized and whether the main processor can execute the instruction. The second threshold can indicate if the auxiliary processor is underutilized and whether the auxiliary processor can execute the instruction.

In some examples, the auxiliary processor is based on an auxiliary instruction set architecture. In some embodiments, the main utilization indicator and the auxiliary utilization indicator can be based on performance characteristics of the main processor and the auxiliary processor. For example, the performance characteristics can include a processor utilization value, a memory utilization value, and a free memory space value. The auxiliary processor manager 122 can also transmit an instruction from the application to the auxiliary processor for execution. Furthermore, the context manager 124 can update context data for the application in response to receiving an execution result from the auxiliary processor.

In some embodiments, an auxiliary processor can access and execute an auxiliary processor virtual machine manager 126 stored in the storage device 118. The auxiliary processor virtual machine manager 126 can initialize a virtual machine and detect an instruction from a main processor to be executed by the auxiliary processor. The auxiliary processor virtual machine manager 126 can also execute the instruction on the auxiliary processor with the auxiliary instruction set architecture and transmit context data corresponding to the execution of the instruction to the main processor.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the virtual machine manager 120, the auxiliary processor manager 122, the context manager 124, and the auxiliary processor virtual machine manager 126 may be partially, or entirely, implemented in hardware and/or in the processors 102. For example, the functionality may be implemented with an application specific integrated circuit, logic implemented in an embedded controller, or in logic implemented in the processors 102, among others. In some embodiments, the functionalities of the virtual machine manager 120, auxiliary processor manager 122, context manager 124, and auxiliary processor virtual machine manager 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
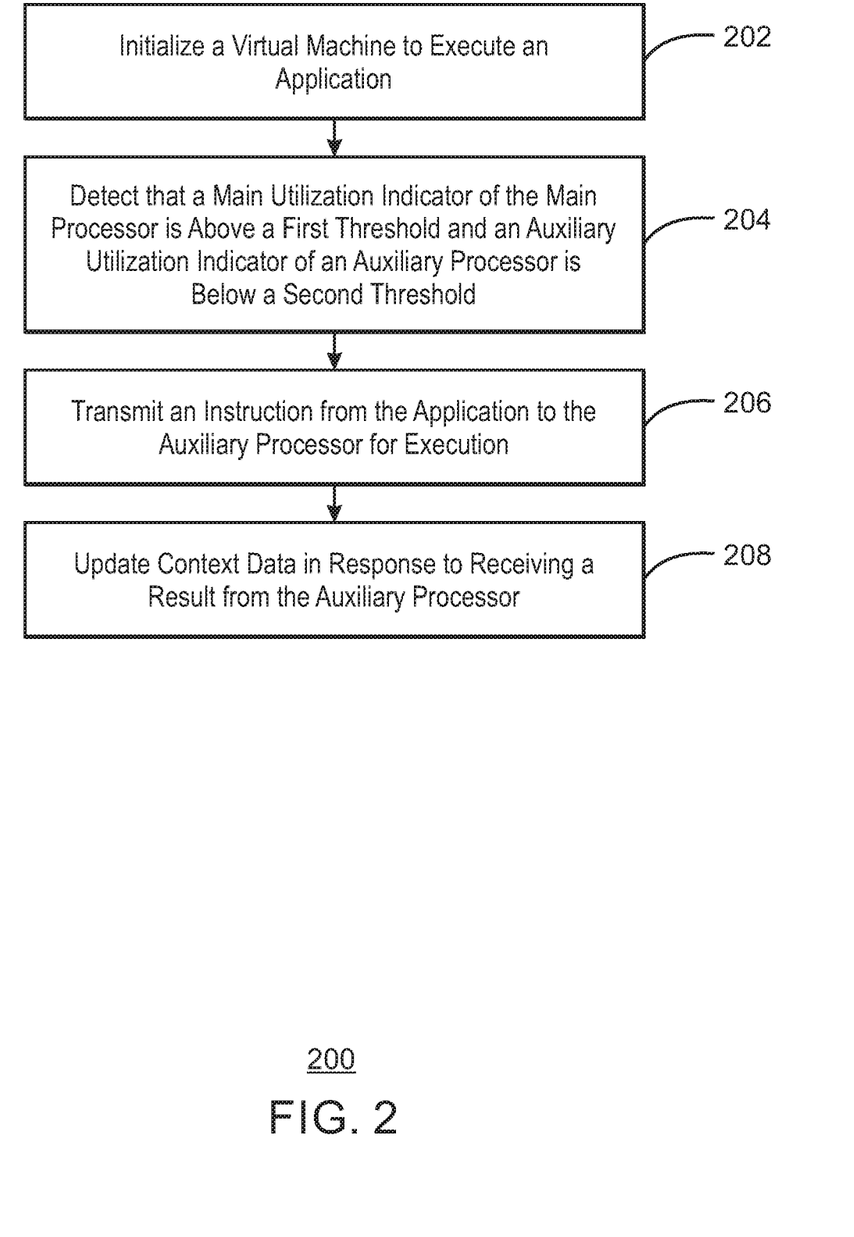
FIG. 2 illustrates a process flow diagram for a main processor to execute an application with auxiliary processors.

FIG. 2 illustrates a process flow diagram for a main processor to execute an application with auxiliary processors. The method 200 illustrated in FIG. 2 can be implemented with any suitable computing component or device, such as the computing device 100 of FIG. 1.

At block 202, the virtual machine manager 120 can initialize a virtual machine to execute an application. A virtual machine, as referred to herein, can include any suitable software used to emulate a computing environment. For example, a virtual machine may emulate an operating system, physical hardware components, and the like. The virtual machine manager 120 can use any suitable hypervisor or virtual machine monitor to create and execute the virtual machine. In some embodiments, the hypervisor can be executed by software, hardware, or firmware. For example, the hypervisor can be executed by hardware components of a system or by an operating system or any other suitable software.

At block 204, the auxiliary processor manager 122 can detect that a main utilization indicator of the main processor is above a first threshold and an auxiliary utilization indicator of an auxiliary processor is below a second threshold. In some examples, the auxiliary processor is based on an auxiliary instruction set architecture that is different from the main instruction set architecture of the main processor. For example, the main processor and the auxiliary processor can use different instruction set architectures, such as x86, ARM, and Open-RISC, among others, to execute instructions.

In some embodiments, the auxiliary processor manager 122 can detect the main utilization indicator and the auxiliary utilization indicator from an operating system scheduler or any other suitable application. The main utilization indicator can include a percentage of main processor clock cycles available to execute the application for the virtual machine, or a time at which the main processor can execute the application for the virtual machine, and the like. The auxiliary utilization indicator can include a percentage of auxiliary processor clock cycles available to execute the application for the virtual machine, or a time at which the auxiliary processor can execute the application for the virtual machine, and the like. In some examples, the auxiliary processor manager 122 can use any suitable configurable or predetermined values as thresholds for the main utilization indicator and the auxiliary utilization indicator. For example, the auxiliary processor manager 122 can determine different thresholds for the main processor and the auxiliary processor. In some embodiments, the main processor executes instructions when the main utilization indicator is below a threshold value. In some embodiments, the auxiliary processor manager 122 determines that an instruction can be executed more efficiently by an auxiliary processor if the main processor indicator is above a threshold indicating the main processor is executing instructions for other applications and the auxiliary utilization indicator is below a threshold indicating that the auxiliary processor is available. In some examples, the main utilization indicator and the auxiliary utilization indicator can be based on performance characteristics such as a processor utilization value, a memory utilization value, and a free memory space value. The processor utilization value can indicate a number of available clock cycles that a processor can dedicate to executing an instruction or set of instructions for an application. The memory utilization value can indicate an amount of memory available by a processor to execute an application and a free memory space value can indicate an amount of storage available to store results from executing an application.

At block 206, the auxiliary processor manager 122 can transmit an instruction from the application to the auxiliary processor for execution. The instruction can include any suitable bytecode, machine executable code, and the like. In some embodiments, the auxiliary processor manager 122 can transmit an inter-process command to the auxiliary processor indicating the instruction to be executed. In some examples, the auxiliary processor manager 122 can also generate an interrupt for the auxiliary processor and transmit a pointer to memory shared between the main processor and the auxiliary processor.

At block 208, the context manager 124 can update context data for the application in response to receiving an execution result from the auxiliary processor. The context data can include stack values, heap values, virtual register values, variable values, and the like. For example, the context manager 124 can detect the context data from the auxiliary processor and update the context data for the application being executed by the virtual machine on the main processor. In some embodiments, the context manager 124 can detect the context data from shared memory, from an inter-process command generated by the auxiliary processor, from an interrupt, and the like. The execution result can indicate a state of the context data following execution of the instruction by the auxiliary processor.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the main processor can execute instructions or bytecode for a second application while the auxiliary processor executes the instruction for a first application.

Figure 3:
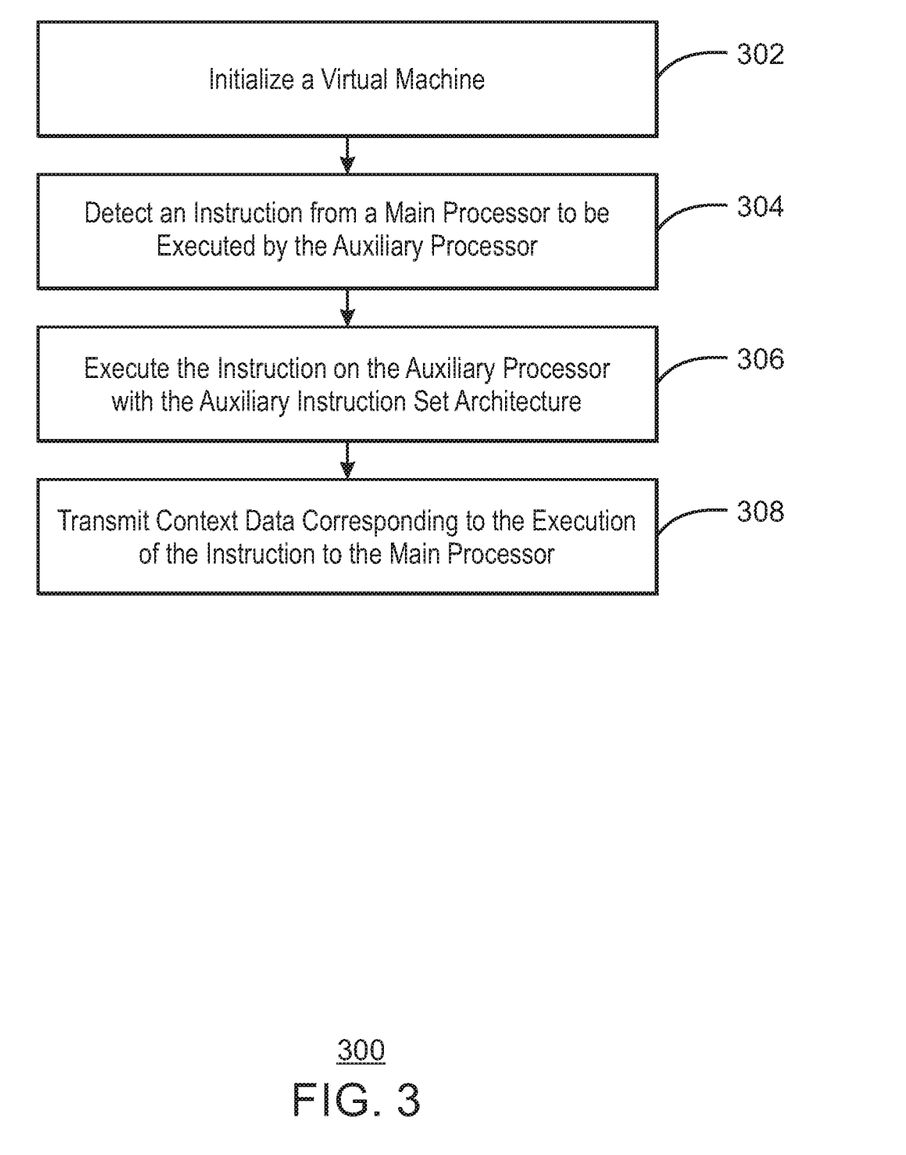
FIG. 3 illustrates a process flow diagram for an auxiliary processor to execute an instruction from a main processor.

FIG. 3 illustrates a process flow diagram for an auxiliary processor to execute an instruction from a main processor. The method 300 illustrated in FIG. 3 can be implemented with any suitable computing component or device, such as the computing device 100 of FIG. 1.

At block 302, the auxiliary processor can initialize a virtual machine. In some embodiments, the auxiliary processor can initialize a separate virtual machine from a virtual machine executed by a main processor. As discussed above, a virtual machine can include any suitable software used to emulate a computing environment. For example, a virtual machine may emulate an operating system, physical hardware components, and the like. The auxiliary processor can use any suitable hypervisor or virtual machine monitor to create and execute the virtual machine. In some embodiments, the hypervisor can be executed by software, hardware, or firmware. For example, the hypervisor can be executed by hardware components of a system or by an operating system or any other suitable software.

At block 304, the auxiliary processor can detect an instruction from a main processor to be executed by the auxiliary processor. For example, the auxiliary processor can detect an interrupt that includes an instruction and a pointer to shared memory, an instruction and data values to be used in executing the instruction, and the like. In some embodiments, the auxiliary processor can detect the instruction from an inter-process communication command that is generated by the virtual machine executed by the main processor. In some examples, the auxiliary processor can poll for instructions to be executed from the main processor.

At block 306, the auxiliary processor can execute the instruction on the auxiliary processor with the auxiliary instruction set architecture. In some embodiments, the auxiliary processor can execute the instruction with the virtual machine executed by the auxiliary processor, which enables the execution of the instruction with an instruction set architecture that differs from the main processor. Executing an instruction by an auxiliary processor is discussed in greater detail below in relation to FIG. 4.

At block 308, the auxiliary processor can transmit context data corresponding to the execution of the instruction to the main processor. The context data, as referred to herein, can include heap values, stack values, variable values, and virtual register values, among others. For example, the context data can indicate values of the state of an application after an instruction has been executed. In some embodiments, the auxiliary processor can transmit the context data to the main processor by storing the context data in memory shared between the main processor and the auxiliary processor and sharing a pointer to the shared memory, transmitting an inter-procedural command to the main processor that includes the context data, and the like.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. In some embodiments, the auxiliary processor can execute any suitable instruction for any application executed by the virtual machine on the auxiliary processor. For example, the auxiliary processor can execute local applications while monitoring for instructions to be executed from a main processor.

Figure 4:
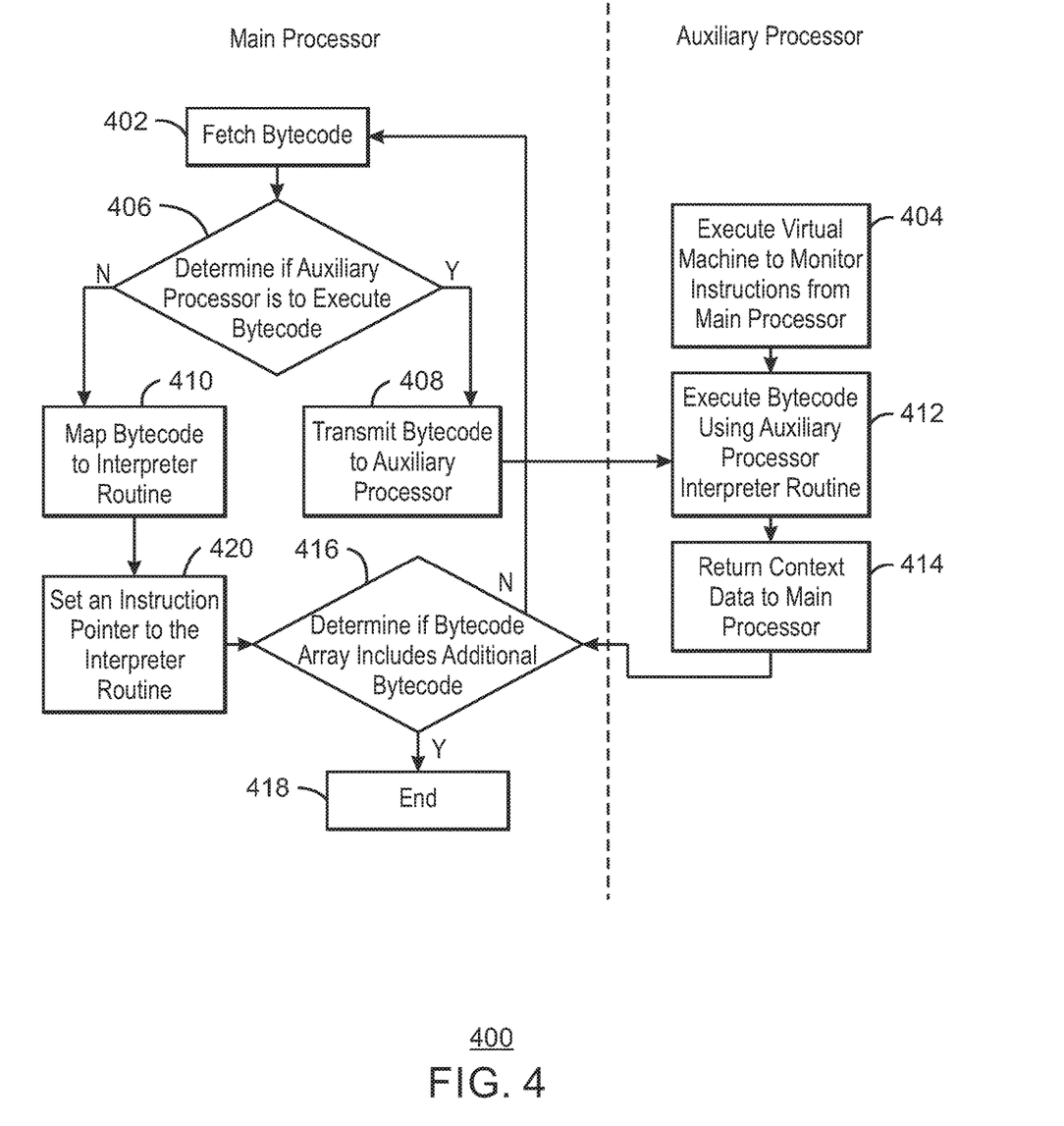
FIG. 4 is a process flow diagram for a system comprising a main processor and an auxiliary processor that can execute an application with different instruction set architectures.

FIG. 4 is a process flow diagram for a system comprising a main processor and an auxiliary processor that can execute an application with different instruction set architectures. The method 400 illustrated in FIG. 4 can be implemented with any suitable computing component or device, such as the computing device 100 of FIG. 1.

At block 402, the main processor can execute a virtual machine to detect a bytecode sequence array and fetch one bytecode from the bytecode sequence array. In some examples, the bytecode sequence array can include any suitable number of bytecodes corresponding to instructions to be executed by an application within the virtual machine. In some examples, the virtual machine includes an interpreter routine for each bytecode type in the bytecode sequence array. As each bytecode type is executed, the interpreter routine can return to a main loop. The main processor can execute the virtual machine using a main instruction set architecture.

At block 404, the auxiliary processor can execute a virtual machine to monitor and detect instructions from the main processor. For example, the auxiliary processor can poll or monitor for an inter-process command indicating bytecode to be executed by the auxiliary processor. The auxiliary processor can execute the virtual machine using an auxiliary instruction set architecture that differs from the main instruction set architecture. For example, the main instruction set architecture and the auxiliary instruction set architecture can be based on x86, RISC, ARM, SPARC, or any other suitable instruction set architectures. In some embodiments, the main instruction set architecture and the auxiliary instruction set architecture can order a significance of bytes in memory, also referred to as endianness, differently. For example, the main instruction set architecture can order bytes using big endianness and the auxiliary instruction set architecture can order bytes using little endianness.

At block 406, the main processor can determine if the auxiliary processor is to execute the bytecode fetched from the bytecode sequence array. For example, the main processor can determine if a main utilization indicator of the main processor is above a first threshold and an auxiliary utilization indicator of an auxiliary processor is below a second threshold. As discussed above, the main processor can detect the main utilization indicator and the auxiliary utilization indicator from an operating system scheduler, or any other software. If the main utilization indicator is above a first threshold and the auxiliary utilization indicator is below a second threshold, the process continues at block 408. If the main utilization indicator is below a first threshold or the auxiliary utilization indicator is above a second threshold, the main processor executes the instruction and the process continues at block 410.

At block 408, the main processor can transmit bytecode to the auxiliary processor for execution. As discussed above, the main processor can transmit the bytecode in an inter-process command, or as an interrupt, among others. In some examples, the main processor can store a value in a memory mapped register of the auxiliary processor indicating that an instruction from the main processor is to be executed by the auxiliary processor.

At block 412, the auxiliary processor can execute the bytecode using an interpreter routine executed by the auxiliary processor. The interpreter routine of the auxiliary processor can use a different instruction set architecture than the interpreter routine for the main processor.

At block 414, the auxiliary processer can return context data to the main processor. As discussed above, the context data can include any suitable heap values, stack values, virtual register values, and the like. In some embodiments, the context data becomes the latest or most recent frame in the memory accessed by the main processor.

At block 416, the main processor can determine if the bytecode sequence array includes additional bytecodes to be executed. If the bytecode sequence array includes additional bytecodes to be executed, the processor returns to block 402. If the bytecode sequence array does not include additional bytecodes to be executed, the process ends at block 418.

In regard to block 410, if the main utilization indicator is below a first threshold or the auxiliary utilization indicator is above a second threshold, the main processor can map a bytecode type to an interpreter routine. The interpreter routine can execute any suitable bytecodes from the bytecode sequence array corresponding to the application being executed in the virtual machine of the main processor.

At block 420, the main processor can set an instruction pointer to an interpreter routine. In some embodiments, the instruction pointer corresponds to an interpreter routine that can execute the bytecode based on the bytecode type. The interpreter routine can execute the instruction using the main instruction set architecture and update context data for the application being executed in the virtual machine for the main processor. The process continues at block 416 to determine if additional bytecodes are to be executed for an application.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the main processor can update the main utilization indicator or the auxiliary utilization indicator after each bytecode is executed or after each bytecode array is executed. In some embodiments, the main processor can execute bytecode for a second application while an instruction is executed by an auxiliary processor for a first application.

Figure 5:
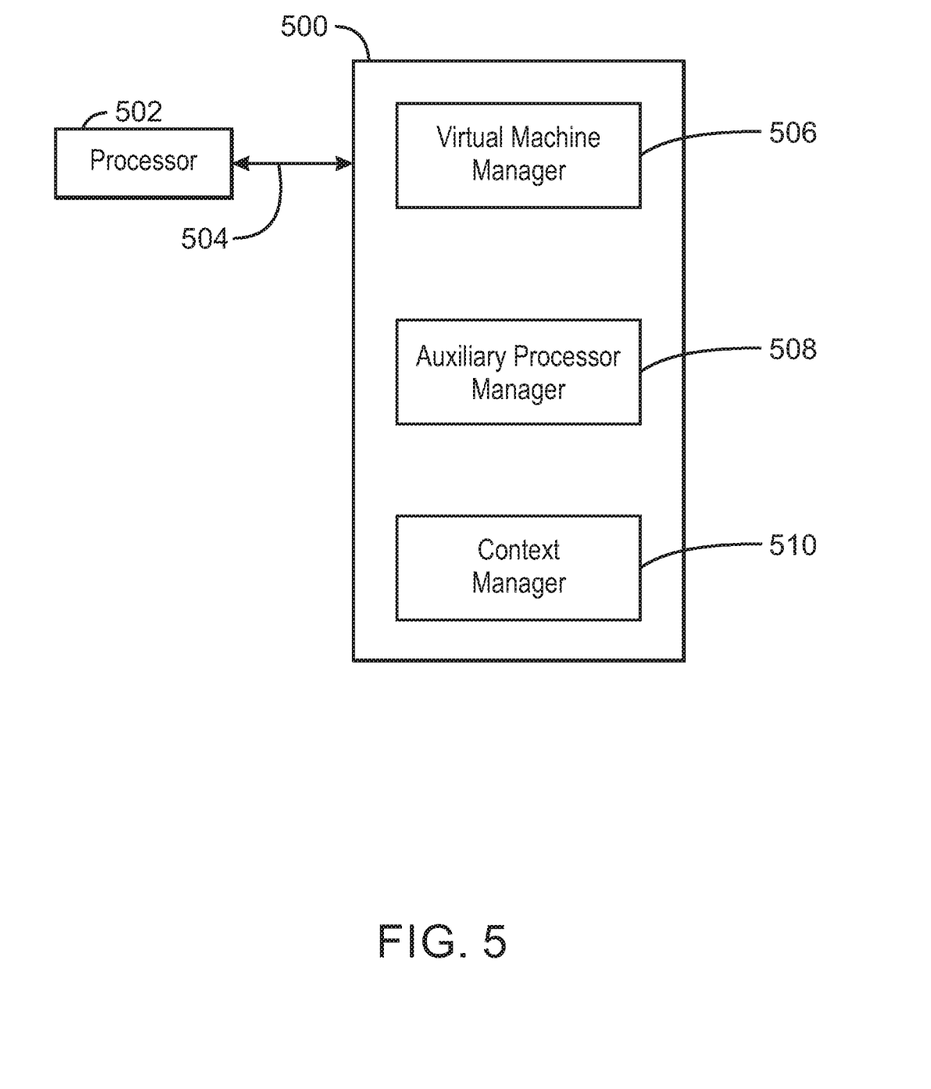
FIG. 5 is an example block diagram of a non-transitory computer readable media for executing an instruction for a main processor with an auxiliary processor.

FIG. 5 is an example block diagram of a non-transitory computer readable media for executing an instruction for a main processor with an auxiliary processor. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a virtual machine manager 506 can initialize a virtual machine to execute an application. In some examples, an auxiliary processor manager 508 can determine a main utilization indicator of the main processor is above a first threshold and an auxiliary utilization indicator of an auxiliary processor is below a second threshold, wherein the auxiliary processor is based on an auxiliary instruction set architecture. The auxiliary processor manager 508 can also transmit an instruction from the application to the auxiliary processor for execution. Furthermore, a context manager 510 can update context data for an application in response to receiving a result from the auxiliary processor.

It is to be understood that any suitable number of the software components shown in FIG. 5 may be included within the tangible, non-transitory computer-readable medium 500. Furthermore, any number of additional software components not shown in FIG. 5 may be included within the tangible, non-transitory, computer-readable medium 500, depending on the specific application.

Figure 6:
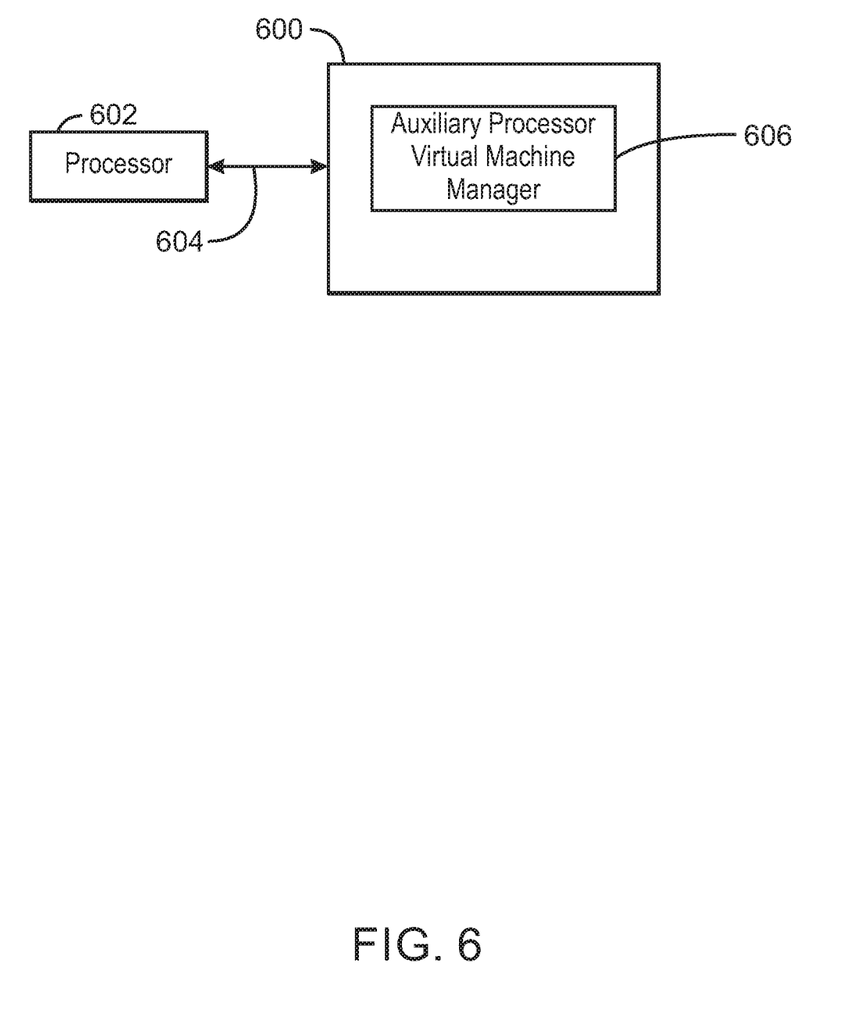
FIG. 6 is an example block diagram of a non-transitory computer readable media for executing an instruction from a main processor with an auxiliary processor.

FIG. 6 is an example block diagram of a non-transitory computer readable media for executing an instruction from a main processor with an auxiliary processor. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the current method.

The various software components discussed herein may be stored on the tangible, non-transitory, computer-readable medium 600, as indicated in FIG. 6. For example, an auxiliary processor virtual machine manager 606 can initialize a virtual machine to execute an application and detect an instruction from a main processor to be executed by the auxiliary processor. The auxiliary processor virtual machine manager 606 can also execute the instruction on the auxiliary processor with the auxiliary instruction set architecture and transmit context data corresponding to the execution of the instruction to the main processor.

It is to be understood that any suitable number of the software components shown in FIG. 6 may be included within the tangible, non-transitory computer-readable medium 600. Furthermore, any number of additional software components not shown in FIG. 6 may be included within the tangible, non-transitory, computer-readable medium 600, depending on the specific application.

Example 1

In some examples, a system for executing an application can include a main processor based on a main instruction set architecture, wherein the main processor can initialize a virtual machine to execute an application and determine a main utilization indicator of the main processor is above a first threshold and an auxiliary utilization indicator of an auxiliary processor is below a second threshold, wherein the auxiliary processor is based on an auxiliary instruction set architecture. The main processor can also transmit an instruction from the application to the auxiliary processor for execution and update context data for the application in response to receiving an execution result from the auxiliary processor.

Alternatively, or in addition, the context data can include a stack, a heap, or a virtual register. Alternatively, or in addition, the main utilization indicator and the auxiliary utilization indicator can be based on performance characteristics of the main processor and the auxiliary processor. Alternatively, or in addition, the performance characteristics can include a processor utilization value, a memory utilization value, and a free memory space value. Alternatively, or in addition, the main processor can execute an instruction for a second application in response to transmitting the instruction for the application to the auxiliary processor. Alternatively, or in addition, the main processor can detect that the instruction resides in memory shared between the main processor and the auxiliary processor, and transmit a pointer to the instruction to the auxiliary processor. Alternatively, or in addition, the instruction can include bytecode.

Example 2

In some embodiments, a system for executing applications can include an auxiliary processor based on an auxiliary instruction set architecture, wherein the auxiliary processor can initialize a virtual machine to execute an application and detect an instruction from a main processor to be executed by the auxiliary processor. The auxiliary processor can also execute the instruction on the auxiliary processor with the auxiliary instruction set architecture and transmit context data corresponding to the execution of the instruction to the main processor.

Alternatively, or in addition, the auxiliary processor can poll for the instruction from the main processor. Alternatively, or in addition, the auxiliary processor can detect an interrupt corresponding to the instruction from the main processor. Alternatively, or in addition, the context data can include a stack, a heap, or a virtual register. Alternatively, or in addition, the instruction can include bytecode.

Example 3

In some embodiments, a method for executing applications can include initializing, via a main processor, a virtual machine to execute an application. The method can also include determining, via the main processor, a main utilization indicator of the main processor is above a threshold and an auxiliary utilization indicator of an auxiliary processor is below a threshold, wherein the auxiliary processor is based on an auxiliary instruction set architecture and the main processor is based on a main instruction set architecture, and wherein the auxiliary instruction set architecture is different from the main instruction set architecture. Furthermore, the method can include transmitting, via the main processor, an instruction from the application to the auxiliary processor for execution and updating, via the main processor, context data for the application in response to receiving an execution result from the auxiliary processor.

Alternatively, or in addition, the context data can include a stack, a heap, or a virtual register. Alternatively, or in addition, the main utilization indicator and the auxiliary utilization indicator can be based on performance characteristics of the main processor and the auxiliary processor. Alternatively, or in addition, the performance characteristics can include a processor utilization value, a memory utilization value, and a free memory space value. Alternatively, or in addition, the method can include executing an instruction for a second application in response to transmitting the instruction for the application to the auxiliary processor. Alternatively, or in addition, the method can include detecting that the instruction resides in memory shared between the main processor and the auxiliary processor, and transmitting a pointer to the instruction to the auxiliary processor. Alternatively, or in addition, the instruction can include bytecode.

Example 4

A non-transitory computer-readable medium for executing applications can include a plurality of instructions that in response to being executed by a main processor, cause the main processor to initialize, via the main processor, a virtual machine to execute an application. The plurality of instructions can also cause the main processor to determine, via the main processor, a main utilization indicator of the main processor is above a threshold and an auxiliary utilization indicator of an auxiliary processor is below a threshold, wherein the auxiliary processor is based on an auxiliary instruction set architecture and the main processor is based on a main instruction set architecture, and wherein the auxiliary instruction set architecture is different from the main instruction set architecture. Additionally, the plurality of instructions can cause the main processor to transmit, via the main processor, an instruction from the application to the auxiliary processor for execution and update, via the main processor, context data for the application in response to receiving an execution result from the auxiliary processor.

Alternatively, or in addition, the context data can include a stack, a heap, or a virtual register. Alternatively, or in addition, the main utilization indicator and the auxiliary utilization indicator can be based on performance characteristics of the main processor and the auxiliary processor. Alternatively, or in addition, the performance characteristics can include a processor utilization value, a memory utilization value, and a free memory space value. Alternatively, or in addition, the plurality of instructions can cause the main processor to execute an instruction for a second application in response to transmitting the instruction for the application to the auxiliary processor. Alternatively, or in addition, the plurality of instructions can cause the main processor to detect that the instruction resides in memory shared between the main processor and the auxiliary processor, and transmit a pointer to the instruction to the auxiliary processor. Alternatively, or in addition, the instruction can include bytecode.

Example 5

In some examples, a system for executing an application can include a main processor based on a main instruction set architecture, wherein the main processor can include means for initializing a virtual machine to execute an application and determining a main utilization indicator of the main processor is above a first threshold and an auxiliary utilization indicator of an auxiliary processor is below a second threshold, wherein the auxiliary processor is based on an auxiliary instruction set architecture. The main processor can also include means for transmitting an instruction from the application to the auxiliary processor for execution and means for updating context data for the application in response to receiving an execution result from the auxiliary processor.

Alternatively, or in addition, the context data can include a stack, a heap, or a virtual register. Alternatively, or in addition, the main utilization indicator and the auxiliary utilization indicator can be based on performance characteristics of the main processor and the auxiliary processor. Alternatively, or in addition, the performance characteristics can include a processor utilization value, a memory utilization value, and a free memory space value. Alternatively, or in addition, the main processor can include means for executing an instruction for a second application in response to transmitting the instruction for the application to the auxiliary processor. Alternatively, or in addition, the main processor can include means for detecting that the instruction resides in memory shared between the main processor and the auxiliary processor, and transmit a pointer to the instruction to the auxiliary processor. Alternatively, or in addition, the instruction can include bytecode.

Example 6

In some embodiments, a system for executing applications can include an auxiliary processor based on an auxiliary instruction set architecture, wherein the auxiliary processor can include means for initializing a virtual machine to execute an application and means for detecting an instruction from a main processor to be executed by the auxiliary processor. The auxiliary processor can also include means for executing the instruction on the auxiliary processor with the auxiliary instruction set architecture and means for transmitting context data corresponding to the execution of the instruction to the main processor.

Alternatively, or in addition, the auxiliary processor can include means for polling for the instruction from the main processor. Alternatively, or in addition, the auxiliary processor can include means for detecting an interrupt corresponding to the instruction from the main processor. Alternatively, or in addition, the context data can include a stack, a heap, or a virtual register. Alternatively, or in addition, the instruction can include bytecode.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by auxiliary processing devices that are linked through a communications network.

Although operations may be described as a sequential process, some of the operations may in fact be performed in parallel, concurrently, and/or in a distributed environment, and with program code stored for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for executing applications comprising:
   first instructions; and
   main processor circuitry based on a main instruction set architecture, wherein the main processor circuitry to execute the first instructions to:
   initialize a virtual machine to execute an application;
   determine a main utilization indicator of the main processor circuitry is above a first threshold and an auxiliary utilization indicator of auxiliary processor circuitry is below a second threshold, wherein the auxiliary processor circuitry is based on an auxiliary instruction set architecture;
   detect that a second instruction associated with an application executed by a virtual machine from the application resides in memory shared between the main processor circuitry and the auxiliary processor circuitry;
   transmit a pointer to the second instruction from the application to the auxiliary processor circuitry for execution; and
   update context data for the application in response to receiving an execution result from the auxiliary processor circuitry.

2. The system of claim 1, wherein the context data includes at least one of a stack, a heap, or a virtual register.

3. The system of claim 1, wherein the main utilization indicator and the auxiliary utilization indicator are based on performance characteristics of the main processor circuitry and the auxiliary processor.

4. The system of claim 3, wherein the performance characteristics include at least one of a processor utilization value, a memory utilization value, or a free memory space value.

5. The system of claim 1, wherein the main processor circuitry is to execute an instruction for a second application in response to transmitting the second instruction for the application to the auxiliary processor circuitry.

6. The system of claim 1, wherein the second instruction includes bytecode.

7. A method for executing applications comprising:
   initializing, via a main processor, a virtual machine to execute an application;
   determining, via the main processor, a main utilization indicator of the main processor is above a first threshold and an auxiliary utilization indicator of an auxiliary processor is below a second threshold, wherein the auxiliary processor is based on an auxiliary instruction set architecture and the main processor is based on a main instruction set architecture, and wherein the auxiliary instruction set architecture is different from the main instruction set architecture;
   detecting, via the main processor, that an instruction from the application resides in memory shared between the main processor and the auxiliary processor;
   transmitting, via the main processor, a pointer to the instruction from the application to the auxiliary processor for execution; and
   updating, via the main processor, context data for the application in response to receiving an execution result from the auxiliary processor.

8. The method of claim 7, wherein the context data includes at least one of a stack, a heap, or a virtual register.

9. The method of claim 7, wherein the main utilization indicator and the auxiliary utilization indicator are based on performance characteristics of the main processor and the auxiliary processor.

10. The method of claim 7, wherein the performance characteristics include at least one of a processor utilization value, a memory utilization value, or a free memory space value.

11. The method of claim 7 comprising executing an instruction for a second application in response to transmitting the instruction for the application to the auxiliary processor.

12. A non-transitory computer-readable medium for executing applications comprising a plurality of instructions that in response to being executed by a main processor, cause the main processor to:
   initialize, via the main processor, a virtual machine to execute an application;
   determine, via the main processor, a main utilization indicator of the main processor is above a first threshold and an auxiliary utilization indicator of an auxiliary processor is below a second threshold, wherein the auxiliary processor is based on an auxiliary instruction set architecture and the main processor is based on a main instruction set architecture, and wherein the auxiliary instruction set architecture is different from the main instruction set architecture;

detect, via the main processor, that an instruction from the application resides in memory shared between the main processor and the auxiliary processor;

transmit, via the main processor, a pointer to the instruction from the application to the auxiliary processor for execution; and update, via the main processor, context data for the application in response to receiving an execution result from the auxiliary processor.

13. The non-transitory computer-readable medium of claim 12, wherein the context data includes at least one of a stack, a heap, or a virtual register.

14. The non-transitory computer-readable medium of claim 12, wherein the main utilization indicator and the auxiliary utilization indicator are based on performance characteristics of the main processor and the auxiliary processor.

15. The non-transitory computer-readable medium of claim 12, wherein the plurality of instructions cause the main processor to detect that the instruction is bytecode.

* * * * *